No. 699,861. Patented May 13, 1902.
A. WIEDENBAUER.
BAIL.
(Application filed Mar. 21, 1901.)
(No Model.)

Witnesses:
Carl H. Crawford
Clement R. Stickney

Inventor:
Alois Wiedenbauer
by Poole & Brown
his Attorney

UNITED STATES PATENT OFFICE.

ALOIS WIEDENBAUER, OF CHICAGO, ILLINOIS, ASSIGNOR TO AMERICAN KEY CAN COMPANY, OF CHICAGO, ILLINOIS, A CORPORATION OF ILLINOIS.

BAIL.

SPECIFICATION forming part of Letters Patent No. 699,861, dated May 13, 1902.

Application filed March 21, 1901. Serial No. 52,156. (No model.)

*To all whom it may concern:*

Be it known that I, ALOIS WIEDENBAUER, of Chicago, in the county of Cook and State of Illinois, have invented certain new and useful Improvements in Bails; and I do hereby declare that the following is a full, clear, and exact description thereof, reference being had to the accompanying drawings, and to the letters of reference marked thereon, which form a part of this specification.

This invention relates to improvements in bails for pails or like vessels.

The invention consists in the matters hereinafter set forth, and more particularly pointed out in the appended claim.

In bails of an ordinary construction, which consist, essentially, of a piece of wire bent into the form of an arc and having inturned or hooked ends, which are inserted in sockets or apertures in the pail-body, any pressure against either end of the bail toward the pail center will throw the other end out of its socket. This occurs when filled pails are packed closely together for shipment or when nests of pails are close together in crates.

The object of this invention is to provide a bail so that transverse pressure against either end will not throw the other end of the bail out of engagement with its socket or ear-aperture.

Figure 1:
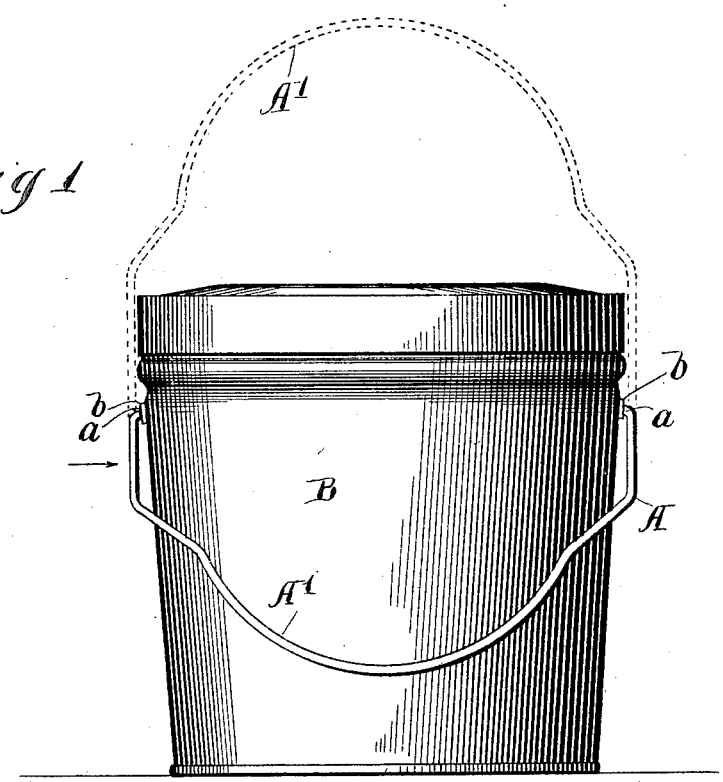
Figure 2:
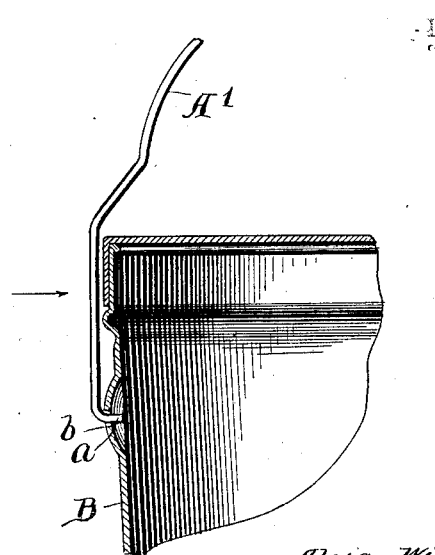

In the drawings, Figure 1 is a view of a pail fitted with a bail embodying the features of this invention. Fig. 2 is a view of a portion of the pail, showing a modification in the socket form.

As shown in the drawings, A designates a bail of a form embodying the features of my invention. Said bail consists of a wire or metal strip of any desired cross-section bent between its ends to form at its middle portion A' an arc and provided with the usual hooked or inturned ends $a$, adapted to engage sockets or ears $b$ of a pail B. The bail near the hooked end thereof is made of such a shape that its parts are close to and approximately parallel to the sides of the pail near the upper margin thereof when the bail is in an upright position, as shown in dotted lines in Fig. 1 and in full lines in Fig. 2, this being the position when the pail is being carried by its bail. For this purpose the end portions of said bail are made straight and approximately parallel with each other. Said end portions of the bail are joined to the curved central portion thereof by means of oblique portions. It will thus be seen that pressure brought to bear transversely to the pail against either end of the bail in the direction indicated by the arrow or in the opposite direction when the bail is in an upright position will merely press the bail against the sides of the pail near the sockets or bail-ears, and therefore so limit its motion that the other end thereof will not be thrown out of engagement with its socket, as would occur were the bail made in the usual form of a continuous arc, as in the latter case the portions of the bail near the sockets stand out so far from the pail that sufficient lateral motion is allowed to free the opposite end of the bail when such lateral pressure is applied thereto. The central portion A' of the bail is curved in such manner that when the bail is depressed into its lowermost position, as shown by the full lines in Fig. 1, which is the position the bail occupies when the full pails are packed for shipment, the central portion A' of the bail lies closely against the peripheral surface of the pail. Consequently any transverse pressure applied to one end of the bail in this position is transmitted to the body of the pail and does not disengage the opposite end of the bail by forcing it out of the socket, any motion of the bail being prevented by the peripheral surface of the pail.

As shown in Fig. 2, it is evident that the bail may be applied to a pail having any usual form of socket-ears, and I do not limit myself to any special form of construction except as set forth in the appended claim.

I claim as my invention—

The combination with a pail, of a bail embracing a central curved portion so shaped as to bear throughout its length against the outer surface of the pail when the bail is in a downwardly-inclined position, and provided with approximately straight parallel end portions having hooks for engagement with sockets in the bail-ears on said pail, said parallel end portions being arranged at a distance apart approximately equal to the external diameter of the upper part of the pail, and oblique portions joining the ends of the curved central portion of the bail with the straight end portions thereof.

In testimony that I claim the foregoing as my invention I affix my signature, in presence of two witnesses, this 19th day of March, A. D. 1901.

ALOIS WIEDENBAUER.

Witnesses:
CLEMENT R. STICKNEY,
WILLIAM L. HALL.